United States Patent
Fouassier et al.

[11] Patent Number: 4,946,621
[45] Date of Patent: Aug. 7, 1990

[54] LUMINESCENT MIXED BORATES BASED ON RARE EARTHS

[75] Inventors: Claude E. Fouassier, Gradignan; Wen T. Fu; Paul Hagenmuller, both of Talence, all of France

[73] Assignee: Centre National de la Recherche Scientifique (CNRS), Paris, France

[21] Appl. No.: 146,812

[22] PCT Filed: Apr. 29, 1987

[86] PCT No.: PCT/FR87/00144
§ 371 Date: Feb. 24, 1988
§ 102(e) Date: Feb. 24, 1988

[87] PCT Pub. No.: WO87/06601
PCT Pub. Date: Nov. 5, 1987

[30] Foreign Application Priority Data
Apr. 29, 1986 [FR] France .................. 86 06181

[51] Int. Cl.$^5$ ................................. C09K 11/78
[52] U.S. Cl. ................................. 252/301.4 R
[58] Field of Search ...................... 252/301.4 R

[56] References Cited
U.S. PATENT DOCUMENTS
4,202,794  5/1980  Lehman ............... 252/301.4 R
4,319,161  3/1982  Looye et al. ........ 252/301.4 R FOREIGN PATENT DOCUMENTS
2410134  9/1974  Fed. Rep. of Germany .
2008204  1/1970  France .
2333036  6/1977  France .
54-62989  5/1979  Japan ............... 252/301.4 R
62-1778   1/1987  Japan ............... 252/301.4 R
475336    8/1969  Switzerland .
2160884   1/1986  United Kingdom .... 252/301.4 R OTHER PUBLICATIONS
Blasse et al, "J. of Chem. Phys.", vol. 47, No. 6, 1967, pp. 1920–1926.

Primary Examiner—Jack Cooper
Attorney, Agent, or Firm—Cushman, Darby & Cushman

[57] ABSTRACT

Monophase crystalline mixed borates having the formula: $M(II)_{1-x}Eu(II)_xM(III)_pEu(III)_qTb(III)_rB_9O_{16}$ wherein M(II) is at least one bivalent metal selected among barium, strontium, lead and calcium, it being understood that, in a given mixed borate, the lead and the calcium, together represent not more than 20% by moles based on the total number of moles of metals M(II); M(III) is a metal selected among lanthanum, gadolinium, yttrium, serium, lutetium and bismuth; x is a number higher or equal to zero and smaller than or equal to 0.2; p, q and r is different from zero; and the sum p+q+r equals 1; preparation method and luminescent composition containing them.

12 Claims, 3 Drawing Sheets

LUMINESCENCE SPECTRUM OF THE BORATE, $Ba_{0.99}Eu_{0.01}GdB_9O_{16}$

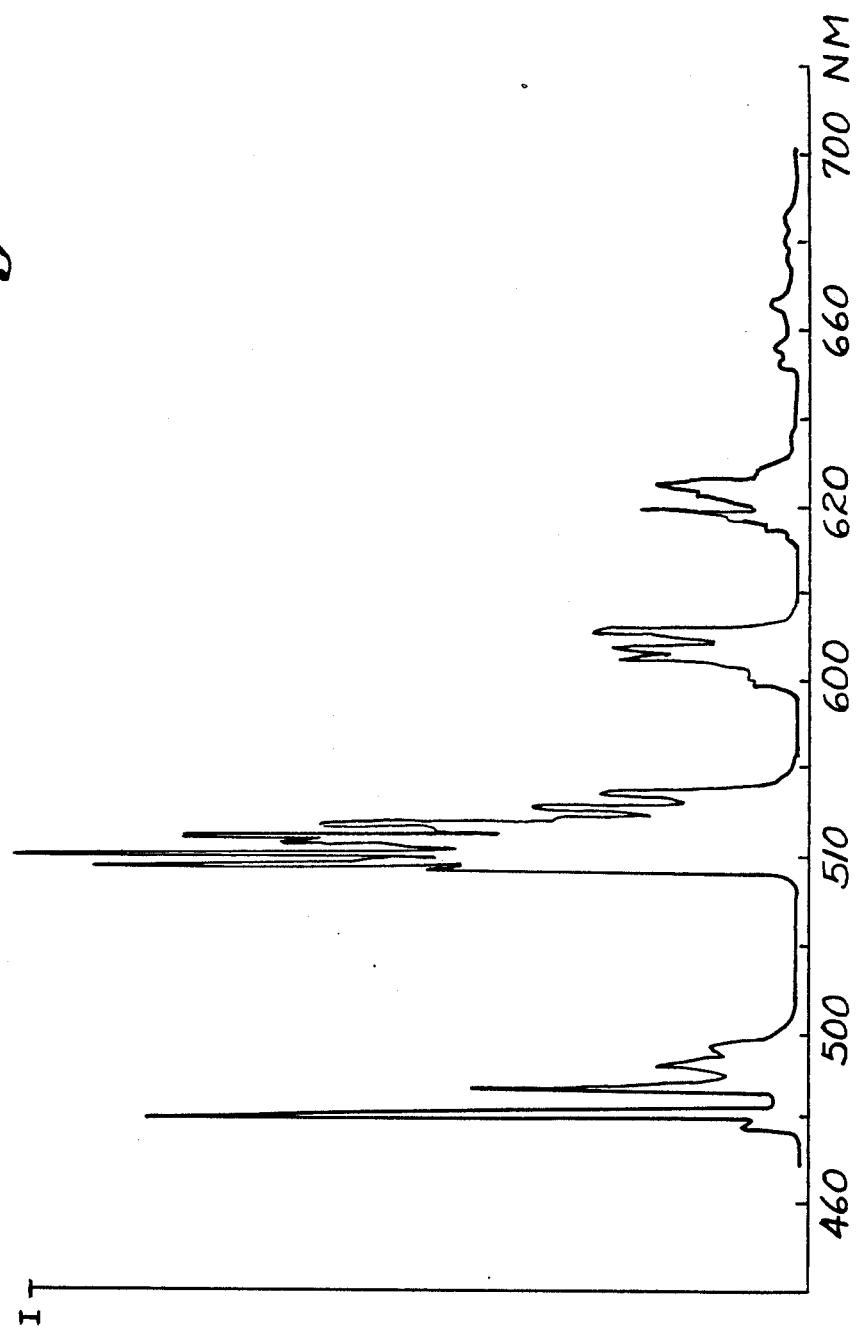

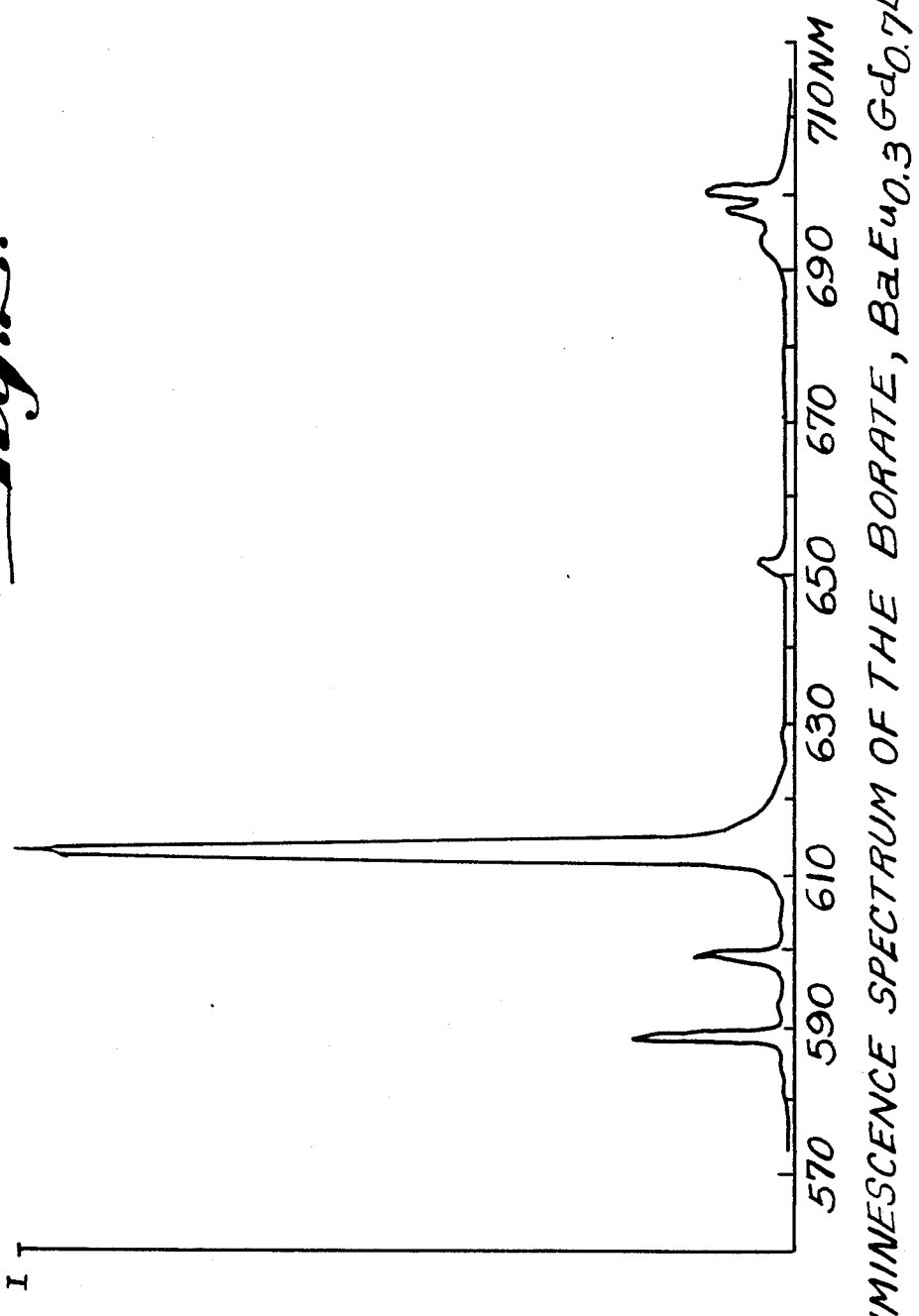

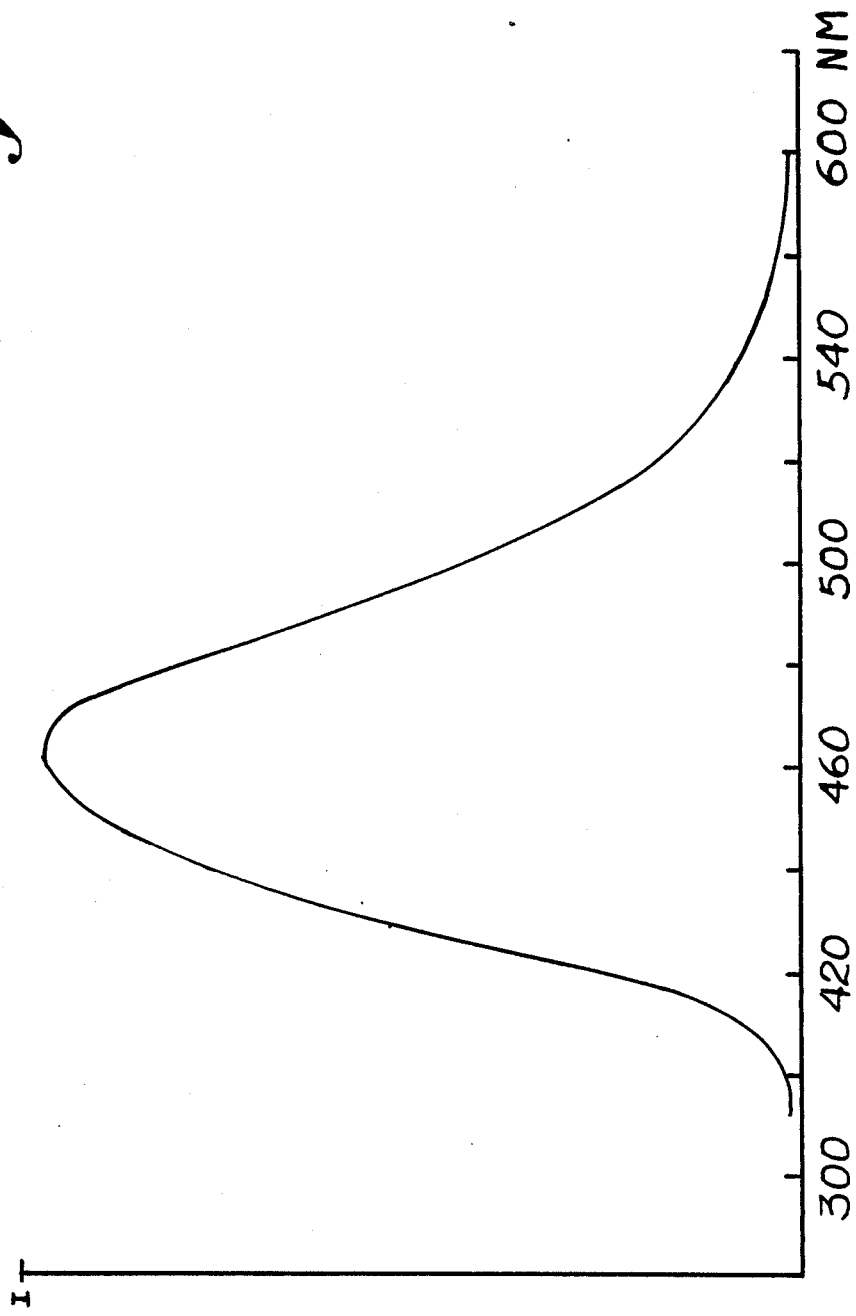
Fig. 3. LUMINESCENCE SPECTRUM OF THE BORATE, $Ba_{0.99}Eu_{0.01}GdB_9O_{16}$

LUMINESCENT MIXED BORATES BASED ON RARE EARTHS

The present invention relates to new mixed borates of rare earths, to their preparation and to their use, principally as luminophores for fluorescent lighting It is known that luminophores based on rare earths are employed in fluorescent tubes for lighting. These fluorescent tubes use rays emitted by mercury vapor under low pressure, which is particularly intense in the short ultraviolet for wavelengths of about 254 nm. The luminophores function to convert this ray into visible light. Generally mixtures of luminophores emitting in wavelengths corresponding to green, red or blue are employed. The conditions which must be filled by the luminophores to give a satisfactory light are known; R. M. Leskela, Rare Earths Spectroscopy, World Scientific, pp. 617-628, 1985.

Luminophores based on rare earths provide yields of light superior to those of transition elements such as alkaline earth chloro-phosphates doped with manganese. However, their production cost limits their use. Efforts are directed principally to obtaining less burdensome red or green luminophores than those actually used, because mercury itself emits in the blue.

The most widely employed green luminophore is an aluminate of a formula approaching $Ce_{0.67}Tb_{0.33}MgAl_{11}O_{19}$; terbium is the luminescent element and cerium is a sensitizer which absorbs mercury rays and transmits the absorbed energy to the terbium.

The most widely used red luminophore is yttrium oxide doped with europium.

For these two luminophores, the preparation temperatures are high; greater than 1500° C. for the aluminate.

A reduction in the production cost of the luminophores can be realized either by reducing the amount of rare earths (particularly europium, terbium and yttrium), or by reducing the preparation temperature.

It has already been proposed to use, as luminescent substances, rare earth borates. Thus, German patent application 2.410.134 envisages the use of a mixed orthoborate of the type, $M_3Ln_2(BO_3)_4$, M being an alkaline earth metal and Ln, a rare earth. These products are obtained by heating corresponding metallic oxides and boron oxide, or their precursors, at a temperature of 1150° C.

More recently there has been described luminophores made of mixed borates of the type $MgLnB_5O_{10}$ that are obtained by heating corresponding oxides or their precursors at a temperature of 1000° C. for 15 hours, see B. Saubat et al., Mat. Res. Bull., Vol. 16, pages 193-198, 1981. These mixed borates permit the use of small amounts of terbium relative to cerium, in comparison with the aluminate.

There has now been discovered the existence of a new family of mixed borates of the type $MLnB_9O_{16}$, which exhibits principally the advantage of being able to be prepared, by reaction in the solid state, at a temperature lower than 1000° C. They possess, moreover, good stability during operation of the fluorescent tubes that are produced therefrom.

These new mixed borates are crystalline products which have characteristic x-ray diffraction spectra, distinct from those of various alkaline-earth borates, rare earth borates and known mixed borates. In other words, the new mixed borates of the present invention are defined compounds. On x-ray diffraction, all intense rays are indexed in the hexagonal system. The following table gives for example the parameters for the host lattice (of the type M(II), $M(III)B_9O_{16}$, where M(II) is barium and M(III) is lanthanum, gadolinium or yttrium):

| M(III) | a (Angstrom) | c (angstrom) |
|---|---|---|
| La | 7.88 | 15.63 |
| Gd | 7.80 | 15.47 |
| Y | 7.78 | 15.40 |

Moreover, the mixed borates of the present invention possess an emission spectrum which is peculiar to them.

The new mixed borates of the present invention exhibit, moreover, the characteristic of being rich in boron oxide. It results from it various advantages, in particular improved stability, a reduction in the amount of rare earths and a reduction in the amount of alkaline earth oxide. The reduction in the amount of rare earths constitutes a significant economic advantage, and the effect of dilution obtained, thanks to an increased proportion of boron oxide, also provides an advantage in that which concerns the emission spectrum, for it is known that certain rare earths exhibit a self-extinction phenomenon at high concentrations. The reduction of the amount of alkaline earth oxide is also interesting, not only for the improvement of chemical stability (they undergo no degradation during the production of fluorescent tubes), but also by reason of the fact that certain alkaline earth borates exhibit a thermal extinction phenomenon close to ambient temperature, so that the possibility of reducing the amount of alkaline earth of a mixed borate appears as a significant advantage, at least in certain cases.

The present invention relates then to new mixed borates characterized by the fact that they constitute monophase crystalline products having the formula $$M(II)_{1-x}Eu(II)_xM(III)_pEu(III)_qTb(III)_rB_9O_{16} \qquad (I)$$

wherein

M(II) represents at least one divalent metal selected from the group consisting of barium, strontium, lead and calcium, it being understood that, in a given borate mixture, lead and calcium, considered together, represent no more than 20 mole percent relative to the total number of moles of metals M(II), M(III) represents a metal selected from the group consisting of lanthanum, gadolinium, yttrium, cerium, lutetium and bismuth, x is a number greater than or equal to zero and lower than or equal to 0.2, p, q and r each represent a number ranging from 0 to 1, it being understood that for a given borate at least one of x, q and r is other than zero and that the sum of p+q+r is equal to 1.

Those skilled in the art will understand that in the borates of formula I, Eu(II), Eu(III) and Tb(III) are the principal luminescent ions, and that the metals M(II) and M(III) play, according to the case, the role of activators or diluents.

Among the mixed borates of formula I, such as defined above, one can mention in particular, (1) those for which at least one of the q and r numbers is zero, (2) those for which at least one of the x and q numbers is zero, (3) those for which x = 0, and in particular those for which x = r = 0; and, among these compounds, those for which MII represents strontium or mixtures of barium or strontium with calcium and/or lead, (4) those for which p ranges from 0 to 0.99, (5) those for which q and r, when they are not zero, range from 0.01 to 1; preferably, r ranges in this case from 0.01 to 0.8, (6) those for which x = q = 0, r is a number ranging from 0.1 to 0.9, and M(III) represents a mixture of $Ce_{p1}M_{p2}$ metals, M being at least one metal selected from the group consisting of lanthanum, yttrium and gadolinium, p1 being a number ranging from 0.1 to 0.9 and p2 being a number such that p1+p2=p, p being defined above; and among these compounds, those for which M represents lanthanum and/or yttrium, (7) those for which x = r = 0, q is a number ranging from 0.2 to 1, and M(III) represents $Bi_{p3}M_{p4}$, p3 being a number greater than 0 and lower than or equal to 0.1 and p4 being such that p3+p4=p, M and p being defined above, and (8) those for which q=0, x is other than zero, r is a number ranging from 0 to 1, and M(III) represents M', M' representing at least one metal selected from the group consisting of lanthanum, gadolinium, yttrium and cerium, and p being defined above.

The present invention also relates to a process for preparing the mixed borates defined above.

This process is principally characterized by the fact that boron oxide and the oxides of the metals employed, or precursors of these oxides, are mixed in the requisite amounts, or even borates of these metals, and that the mixture is heated at a temperature sufficient to form the desired formula I compound. This temperature is generally between 850° and 1000° C, and most often between 900° and 1000° C.

The precursors of the metal oxides are principally hydroxides or mineral or organic salts capable of decomposing, on heating, to the oxides. Such salts are, for example, carbonates, oxalates, acetates, nitrates, etc. However, there can also be employed, as starting materials, the borates of the requisite metals. Moreover, boric acid can also be used as the source of boron oxide.

In the case where the mixed borates contain Eu(II) or Tb(III) metals, it is appropriate to operate in a slightly reducing atmosphere, for example, in the presence of hydrogen diluted with argon or nitrogen.

When the desired mixed borates contain Eu(III), it is appropriate to operate in an oxidizing atmosphere, for example in an atmosphere of oxygen or even in air.

By regulating the reducing and/or oxidizing atmosphere, it is possible to obtain mixed borates of formula I containing both Eu(II) and Eu(III) and/or Tb(III).

The present invention also relates to luminescent compositions, characterized by the fact that they include at least one mixed borate such as defined above. These compositions can contain for example, other than the mixed borate, an excess of $B_2O_3$ and/or an oxide of M(II) metal. This excess is for example 20 mole percent of $B_2O_3$, and/or 50 mole percent of the M(II) oxide, relative to the composition of the formula I product.

These contingent excesses of $B_2O_3$ and/or M(II) metal oxide can be present in the mixture of the starting material employed to prepare the formula I product.

The compositions of the present invention can be used in all situations requiring luminescent compositions, eventually those being able to be excited by ultraviolet. They are useful in fluorescent lamps and tubes, and, in particular, in mercury vapor discharge lamps. They can also be employed in plasma panels, and also as optical coding agents, for example, for special papers.

They can also be incorporated, in a known manner, in ceramics for dental prostheses.

Finally, the compositions based on terbium can be used as the green luminophore in xerographic reproduction devices.

The compositions of the present invention are used and applied in accordance with conventional methods.

The following nonlimiting examples and accompanying drawings are given to illustrate the present invention.

In the drawings:

FIG. 1 shows the luminescence spectrum for the borate $BaCe_{0.6}Tb_{0.4}B_9O_{16}$, FIG. 2 shows the luminescence spectrum for the borate, $BaEu_{0.3}Gd_{0.7}B_9O_{16}$, and FIG. 3 shows the luminescence spectrum for the borate, $Ba_{0.99}Eu_{0.01}GdB_9O_{16}$.

EXAMPLE 1

A compound having the formula $BaCe_{0.6}Tb_{0.4}B_9O_{16}$ is prepared starting with the following mixture:

| Starting Product | Amount |
| --- | --- |
| $Ba(NO_3)_2$ | 4.181 g |
| $CeO_2$ | 1.652 g |
| $Tb_4O_7$ | 1.196 g |
| $B_2O_3$ | 5.013 g |

These products are intimately mixed by crushing; the mixture is introduced into an aluminum crucible and heated in a furnace at 950° C. under a current of hydrogen diluted with an inert gas (nitrogen or argon) for 15 hours.

The resulting product is provided in the form of a white powder, insensitive to the action of water. Irradiated by radiation having a wavelength between 250 and 300 nm, it exhibits an intense luminescence having a green-yellow color. The emission spectrum is represented in FIG. 1.

EXAMPLE 2

A compound having the formula $BaCe_{0.2}Gd_{0.5}Tb_{0.3}B_9O_{16}$ is prepared starting with the following mixture:

| Starting Product | Amount |
| --- | --- |
| $Ba(NO_3)_2$ | 4.181 g |
| $CeO_2$ | 0.551 g |
| $Gd_2O_3$ | 1.450 g |
| $Tb_4O_7$ | 0.897 g |
| $B_2O_3$ | 5.013 g |

These starting products are mixed and treated in the same manner as set forth in EXAMPLE 1.

Excited by radiation having a wavelength between 250 and nm, the resulting product exhibits an intense luminescence similar to that of the product of EXAMPLE 1.

EXAMPLE 3

A compound having the following formula $BaEu_{0.3}Gd_{0.7}B_9O_{16}$ is prepared starting with the following mixture:

| Starting Product | Amount |
| --- | --- |
| Ba(NO$_3$)$_2$ | 4.181 g |
| Eu$_2$O$_3$ | 0.845 g |
| Gd$_2$O$_3$ | 2.021 g |
| B$_2$O$_3$ | 5.013 g |

These starting products are intimately admixed by crushing or grinding. The resulting mixture is introduced into an aluminum crucible and heated in a furnace at 950° C. under a current of oxygen for 15 hours.

The resulting product is provided in the form of a white powder. Irradiated by ultraviolet radiation at 253.7 nm, it exhibits an intense red luminescence whose spectrum is given in FIG. 2.

EXAMPLE 4

A compound having the formula Ba$_{0.99}$Eu$_{0.01}$GdB$_9$O$_{16}$ is prepared starting with the following mixture:

| Starting Product | Amount |
| --- | --- |
| Ba(NO$_3$)$_2$ | 4.140 g |
| Eu$_2$O$_3$ | 0.028 g |
| Gd$_2$O$_3$ | 2.900 g |
| B$_2$O$_3$ | 5.013 g |

These starting products are mixed and treated in the same manner as set forth in EXAMPLE 1, except that a gold crucible is employed. Subjected to the action of ultraviolet radiation, the resulting product exhibits intense blue luminescence—see FIG. 3.

EXAMPLE 5

A compound having the formula BaEu$_{0.2}$Y$_{0.8}$B$_9$O$_{16}$ is prepared starting with the following mixture:

| Starting Product | Amount |
| --- | --- |
| Ba(NO$_3$)$_2$ | 4.181 g |
| Eu$_2$O$_3$ | 0.563 g |
| Y$_2$O$_3$ | 1.445 g |
| B$_2$O$_3$ | 5.013 g |

These starting products are mixed and treated in the same manner as set forth in EXAMPLE 3.

Subjected to the action of ultraviolet radiation, the resulting product exhibits an intense orange luminescence.

EXAMPLE 6

A compound having the formula BaEu$_{0.3}$Gd$_{0.695}$Bi$_{0.005}$B$_9$O$_{16}$ is prepared starting with the following materials:

| Starting Product | Amount |
| --- | --- |
| Ba(NO$_3$)$_2$ | 4.181 g |
| Eu$_2$O$_3$ | 0.845 g |
| Gd$_2$O$_3$ | 2.015 g |
| Bi$_2$O$_3$ | 0.039 g |
| B$_2$O$_3$ | 5.013 g |

These starting products are mixed and treated in the same manner as set forth in EXAMPLE 3.

Subjected to the action of ultraviolet radiation, the resulting product exhibits an intense red luminescence.

EXAMPLE 7

A compound having the formula Ba$_{0.99}$Pb$_{0.01}$La$_{0.7}$Eu$_{0.3}$B$_9$O$_{16}$ is prepared starting with the following products:

| Starting Product | Amount |
| --- | --- |
| Ba(NO$_3$)$_2$ | 4.140 g |
| PbCO$_3$ | 0.043 g |
| La$_2$O$_3$ | 1.825 g |
| Eu$_2$O$_3$ | 0.845 g |
| B$_2$O$_3$ | 5.013 g |

These starting products are mixed and treated in the same manner as set forth in EXAMPLE 3.

Subjected to the action of ultraviolet radiation, the resulting product exhibits an intense red luminescence.

EXAMPLE 8

A compound having the formula Sr$_{0.95}$Eu$_{0.05}$GdB$_9$O$_{16}$ is prepared starting with the following products:

| Starting Product | Amount |
| --- | --- |
| SrCO$_3$ | 2.244 g |
| Eu$_2$O$_3$ | 0.141 g |
| GdO$_3$ | 2.900 g |
| B$_2$O$_3$ | 5.013 g |

These starting products are mixed and treated in the same manner as set forth in EXAMPLE 4.

Subjected to the action of ultraviolet radiation, the resulting product exhibits an intense blue luminescence (maximum at 475 nm).

EXAMPLE 9

A compound having the formula Sr$_{0.85}$Ca$_{0.10}$Eu$_{0.05}$GdB$_9$O$_{16}$ is prepared starting with the following products:

| Starting Product | Amount |
| --- | --- |
| SrCO$_3$ | 2.008 g |
| CuCO$_3$ | 0.160 g |
| Eu$_2$O$_3$ | 0.141 g |
| Gd$_2$O$_3$ | 2.900 g |
| B$_2$O$_3$ | 5.013 g |

These starting products are mixed and treated in the same manner as set forth in Example 4.

Subjected to the action of ultraviolet radiation, the resulting product exhibits an intense blue luminescence.

EXAMPLES 10 to 25

In an analogous manner, the following compounds or compositions have been prepared:

| Example | Compound | Luminescence |
| --- | --- | --- |
| 10 | BaCe$_{0.2}$La$_{0.5}$Tb$_{0.3}$B$_9$O$_{16}$ | green-yellow |
| 11 | BaCe$_{0.2}$Y$_{0.5}$Tb$_{0.3}$B$_9$O$_{16}$ | green-yellow |
| 12 | SrCe$_{0.2}$Gd$_{0.5}$Tb$_{0.3}$B$_9$O$_{16}$ | green-yellow |
| 13 | BaCe$_{0.2}$Gd$_{0.5}$Tb$_{0.3}$B$_9$O$_{16}$·0.5B$_2$O$_3$ | green-yellow |
| 14 | BaCe$_{0.2}$Gd$_{0.5}$Tb$_{0.3}$B$_9$O$_{16}$·0.5B$_2$O$_4$ | green-yellow |
| 15 | BaCe$_{0.2}$Lu$_{0.5}$Tb$_{0.3}$B$_9$O$_{16}$ | green-yellow |
| 16 | BaEu$_{0.3}$La$_{0.7}$B$_9$O$_{16}$ | red |
| 17 | BaEu$_{0.3}$Gd$_{0.7}$B$_9$O$_{16}$ | red |
| 18 | BaEu$_{0.3}$Gd$_{0.7}$B$_9$O$_{16}$·0.5B$_2$O$_3$ | red |
| 19 | BaEu$_{0.3}$Gd$_{0.7}$B$_9$O$_{16}$·0.5BaB$_2$O$_4$ | red |

-continued

| Example | Compound | Luminescence |
|---|---|---|
| 20 | $BaCe_{0.1}Tb_{0.9}B_9O_{16}$ | green-yellow |
| 21 | $BaCe_{0.9}Tb_{0.1}B_9O_{16}$ | green-yellow |
| 22 | $BaCe_{0.8}La_{0.1}Tb_{0.1}B_9O_{16}$ | green-yellow |
| 23 | $BaEu_{0.2}Gd_{0.8}B_9O_{16}$ | red |
| 24 | $BaEuB_9O_{16}$ | red |
| 25 | $BaEu_{0.2}Bi_{0.1}Y_{0.7}B_9O_{16}$ | orange |

We claim:

1. A luminescent mixed borate consisting of a monophase crystalline product having the formula $$M(II)_{1-x}Eu(II)_xM(III)_pEu(III)_qTb(III)_rB_9O_{16} \quad (I)$$

wherein
M(II) represents at least one divalent metal selected from the group consisting of barium, strontium, lead and calcium, with the proviso that in said mixed borate, the amount of lead and calcium taken together does not represent more than 20 molar percent relative to the total number of moles of said M(II) metal,
M(III) represents a metal selected from the group consisting of lanthanum, gadolinium, yttrium, cerium, lutetium and bismuth,
x is a number greater than or equal to 0 and lower than or equal to 0.2,
p, q and r each represent a number ranging from 0 to 1, with the proviso that for a given borate at least one of the x, q and r numbers is other than 0 and the sum or p+q+r is equal to 1, and wherein said mixed borate is selected from the group consisting of (1) that for which q equals 0 and (2) that for which x equals r equals 0 and when q=r=0, M(II) is barium and M(III) is gadolinium, the mixed borate has a luminescence spectrum substantially as depicted in FIG. 3.

2. The mixed borate of claim 1 wherein p ranges from 0 to 0.99.

3. The mixed borate of claim 1 wherein q and r, when they are not 0, range from 0.01 to 1.

4. The mixed borate of claim 1 wherein the q and r numbers are both 0.

5. The mixed borate of claim 1 wherein the x and q numbers are both 0.

6. The mixed borate of claim 1 wherein x=q=0, r is a number ranging from 0.1 to 0.9, and $M(III)_p$ represents the mixture of metals, $Ce_{p1}M_{p2}$ wherein M represents at least one metal selected from the group consisting of lanthanum, yttrium and gadolinium, p1 is a number ranging from 0.1 to 0.9 and p2 is a number such that p1+p2=p, p being defined in claim 1.

7. The mixed borate of claim 6 wherein M represents lanthanum and/or ytrrium.

8. The mixed borate of claim 1 wherein x=r=0, q is a number ranging from 0.2 to 1, and $M(III)_p$ represents $Bi_{p3}M_{p4}$ wherein p3 is a number greater than 0 and lower than or equal to 0.1 and p4 is a number such that p3+p4=p, p being defined in claim 1 and M is at least a metal selected from lanthanum, yttrium and gadolinium.

9. The mixed borate of claim 1 wherein q=0, x is other than 0, r is a number ranging from 0 to 1, and M(III) represents M' wherein M' represents at least one metal selected from the group consisting of lanthanum, gadolinium, yttrium and cerium.

10. The mixed borate of claim 1 wherein M(II) represents Sr or mixtures of barium or strontium with calcium and/or lead and wherein said mixed borates are those for which x equals r equals 0.

11. A mixed borate as defined in claim 1 containing terbium for use as a green luminiphore in a xerographic reproduction device.

12. A luminescent composition comprising at least one mixed borate consisting of a monophase crystalline product having the formula $$M(II)_{1-x}Eu(II)_xM(III)_pEu(III)_qTb(III)_rB_9O_{16} \quad (I)$$

wherein
M(II) represents at least one divalent metal selected from the group consisting of barium, strontium, lead and calcium, with the proviso that in said mixed borate, the amount of lead and calcium taken together does not represent more than 20 molar percent relative to the total number of moles of said M(II) metal,
M(III) represents a metal selected from the group consisting of of lanthanum, gadolinium, yttrium, cerium, lutetium and bismuth,
x is a number greater than or equal to 0 and lower than or equal to 0.2,
p, q and r each represent a number ranging from 0 to 1, with the proviso that for a given borate at least one of the x, q and r numbers is other than 0 and the sum of p+q+r is equal to 1, and wherein said mixed borate is selected from the group consisting of (1) that for which q equals 0 and (2) that for which x equals r equals 0 and when q=r=0, M(II) is barium and M(III) is gadolinium, the mixed borate has a luminescence spectrum substantially as depicted in FIG. 3, and an excess of $B_2O_3$ and/or an oxide of M(II) metal wherein M(II) is defined above, said excess being 20 mole percent of said $B_2O_3$ and/or 50 mole percent of said oxide of M(II) metal relative to said at least one mixed borate.

* * * * *